(12) United States Patent
Kim et al.

(10) Patent No.: US 9,614,552 B2
(45) Date of Patent: Apr. 4, 2017

(54) MILLIMETER-WAVE MODULATION DEVICE

(71) Applicant: KOREA ELECTRONICS TECHNOLOGY INSTITUTE, Seongnam-si (KR)

(72) Inventors: Ki Jin Kim, Yongin-si (KR); Kwang Ho Ahan, Yongin-si (KR); Sang Hoon Park, Seoul (KR)

(73) Assignee: KOREA ELECTRONICS TECHNOLOGY INSTITUTE, Seongnam-Si (KR)

( * ) Notice: Subject to any disclaimer, the term of this patent is extended or adjusted under 35 U.S.C. 154(b) by 0 days.

(21) Appl. No.: 14/956,587

(22) Filed: Dec. 2, 2015

(65) Prior Publication Data

US 2016/0156489 A1 Jun. 2, 2016

(30) Foreign Application Priority Data

Dec. 2, 2014 (KR) .................. 10-2014-0170297

(51) Int. Cl.
| | |
|---|---|
| *H03C 3/00* | (2006.01) |
| *H04L 27/20* | (2006.01) |
| *H04B 1/04* | (2006.01) |
| *H04L 7/033* | (2006.01) |
| *H04L 27/00* | (2006.01) |

(52) U.S. Cl.
CPC ............ *H04B 1/04* (2013.01); *H04L 7/0331* (2013.01); *H04L 27/2014* (2013.01); *H04L 27/2039* (2013.01); *H04L 2027/0016* (2013.01); *H04L 2027/0018* (2013.01); *H04L 2027/0055* (2013.01); *H04L 2027/0091* (2013.01)

(58) Field of Classification Search
USPC ........ 375/211, 215, 219, 220, 221, 222, 259, 375/284, 285, 295, 297, 299, 316, 324, 375/327, 354, 373, 376, 375
See application file for complete search history.

(56) References Cited

U.S. PATENT DOCUMENTS

| | | | | |
|---|---|---|---|---|
| 2012/0257653 A1* | 10/2012 | Nagaishi | ............. | H01Q 3/2682 375/219 |
| 2012/0289338 A1* | 11/2012 | Chen | ....................... | A63F 13/06 463/39 |
| 2013/0070791 A1* | 3/2013 | Roberts | ............... | H04B 7/0417 370/537 |
| 2013/0120190 A1* | 5/2013 | McCune, Jr. | ........ | H01Q 3/2605 342/368 |
| 2014/0256376 A1* | 9/2014 | Weissman | ............. | H04B 17/19 455/550.1 |
| 2014/0269967 A1* | 9/2014 | Tsutsui | ................ | H04B 7/0417 375/267 |

\* cited by examiner

*Primary Examiner* — Linda Wong
(74) *Attorney, Agent, or Firm* — Frost Brown Todd LLC

(57) ABSTRACT

Provided is a lower power and high efficiency millimeter-wave modulation apparatus capable of modulating digital data into transmitting signals in a millimeter frequency band, the millimeter-wave modulation apparatus including; a modulation part, which carries out a modulation of a constant envelope attribute, and to which a first local oscillation signal is fixed according to a rate of input data; a phase shifter adopted to shift a phase of an output of the modulation part; a power amplifier adopted to amplify an output of the phase shifter; and an antenna connected to an output of the power amplifier.

5 Claims, 7 Drawing Sheets

MILLIMETER-WAVE MODULATION DEVICE

CROSS-REFERENCE TO RELATED APPLICATION

This application claims priority to Korean Patent Application No. 10-2014-0170297, filed on Dec. 2, 2014, in the Korean Intellectual Property Office, the entire contents of which are hereby incorporated by reference.

BACKGROUND OF THE INVENTION

Field of the Invention

Embodiments of the present invention relate to millimeter-wave modulation apparatuses, and more particularly, to a low power and high efficiency millimeter-wave modulation apparatus capable of modulating digital data to a transmitting signal in a millimeter frequency band.

Description of the Related Arts

According to the exhaustion of radio frequency resources used in communication, worldwide interest has been on utilization of a millimeter wave band. When a millimeter wave band is used, it is advantageous in that the millimeter wave band can be used in existing other radio communication systems without interference, and giga radio systems can be easily established even when a communication technique having low frequency efficiency is used. In particular, as it a micro process of a CMOS (Complementary Metal Oxide Semiconductor), which is a standard process technique for semiconductors, has become a possibility even under a technical condition of 100 nm or less, a transmitter-receiver in a millimeter wave band may enable an RF circuit in a band of 60 GHz to be easily implemented. Thus, utilization the millimeter wave band in communications has been promoted.

FIG. 1 is an exemplary view showing a structure of a conventional millimeter transmitter.

The millimeter transmitter illustrated in FIG. 1 has a structure in which path I and path Q are made in order to put many pieces of communication information in the same frequency resource; a signal modulated in a digital circuit is up-converted into a millimeter frequency through a digital analogue converter (DAC) and an I/Q mixer; and amplified power of the power amplifier is finally controlled for enabling transmission to a desired communication distance.

In this case, in order to increase frequency efficiency, complicated digital modulation methods is used. Various methods, such as from a QPSK (Quadrature Phase Shift Keying) method to a 64QAM (Quadrature Amplitude Modulation) method, are applied. However, it is problematic in that a PARR (Peak to Average Power Ratio) required by a modulation method becomes higher as a level of the modulation method becomes gradually higher. In terms of the power amplifier, this may be interpreted to the extent that the power amplifier (PA), which is a final output terminal, provides back-off power.

Currently, in a frequency band of 3~4 GHz, a PAPR is about 8 dB, and the power amplifier is used by providing back-off power to the extent of 8 dB. In particular, such a system causes a more problem in a millimeter wave band. This is because the efficiency of a power amplifier used in a millimeter frequency is remarkably reduced compared to that of a power amplifier used in a frequency of 3~4 GHz. Furthermore, when high back-off power is applied, power consumed by the millimeter power amplifier is mostly consumed as heat so that entire efficiency of the transmitter is rapidly reduced.

FIG. 2 is an exemplary view showing a structure of a conventional millimeter-wave OOK modulation.

The millimeter-wave transmitter illustrated in FIG. 2 has an OOK (On-off Keying) structure and may carry out a very simple modulation by turning on or off a mixer or a power amplifier. Thus, it has a structure suitable for a system in which a power amplifier increases the efficiency of output power by minimizing a PAPR, thereby facilitating transmission with lower power. However, the millimeter OOK modulation apparatus having such a structure is disadvantageous in that frequency efficiency is not maximized, the efficiency of power compared with modulation is not high, and the apparatus is vulnerable to noise because it includes amplitude information.

FIG. 3 is a partial exemplary view showing a structure of a conventional millimeter-wave array transmitter.

In the millimeter-wave array transmitter illustrated in FIG. 3, the size of an antenna becomes small due to a short wavelength, and as a result, it is advantageous in that an array is easily performed compared to a 3G or 4G system. In addition to this, power, which cannot be obtained by a single power amplifier, may be obtained by several power amplifiers. That is, a method of obtaining a high output by combining the power of several power amplifiers in the air provides many advantages in establishing millimeter systems. Despite the fact that a currently used array transmitter structure has only an advantage that a power amplifier outputs low power because a modulated signal is applied to the power amplifier in a state of being power-distributed and being phase-shifted, the structure has a limit that there is no improvement in terms of efficiency.

SUMMARY OF THE INVENTION

An aspect of embodiments of the present invention provides a millimeter-wave modulation apparatus capable of increasing power efficiency, as well as transmission efficiency, using a constant envelope modulation mode for enhancing data transmission efficiency of a millimeter-wave transmitter for a high speed data communications.

In order to solve the technical problems, according to an aspect of the present invention, a millimeter-wave modulation apparatus includes: a modulation part, which carries out a modulation of a constant envelope attribute, and to which a first local oscillation signal is fixed according to a rate of input data; a phase shifter adopted to shift a phase of an output of the modulation part; a power amplifier adopted to amplify an output of the phase shifter; and an antenna connected to an output of the power amplifier.

In one embodiment, the modulation part may include: a first local oscillator to which a first local oscillation signal is fixed according to an input data rate of data I or data Q; a quadrature generator adopted to convert the first local oscillation signal into an I-signal of an in-phase and a Q-signal of a quadrature phase; a first mixer and a second mixer adopted to receive the data I and data Q, respectively, and to receive the I-signal and the Q-signal of the quadrature generator, respectively; an adder adopted to add an output of the first mixer and an output of the second mixer; and a third mixer adopted to up-convert an output of the adder and a second local oscillation signal in a millimeter wave band of the second local oscillator.

In one embodiment, the millimeter-wave modulation apparatus may further include a phase locked loop providing a reference signal having a frequency in the millimeter wave band to the second local oscillator.

In one embodiment, the first local oscillator may include an injection locking oscillator.

In one embodiment, the modulation part, the phase shifter, the power amplifier, and the antenna may be included in each transmitter unit of the modulation apparatus, the plurality of transmitter units being arranged in an array form for a space modulation.

In one embodiment, the modulation part may carry out an MSK (Minimum Shift Keying) modulation.

In one embodiment, the phase shifter, the power amplifier, and the antenna may be included in each transmitter unit of the modulation apparatus, the plurality of transmitter units being connected to the modulation part via a switching device.

In one embodiment, the switching device may include: a plurality of switches installed between each phase shifter and the modulation part; a delay drive part having a plurality of delay locked loops, each of which is installed between each of the plurality of switches and the modulation part; and a delay control part extracting delay information for controlling the delay drive part based on signals transmitted to each phase shifter via each of the plurality of switches.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE INVENTION

Figure 1:
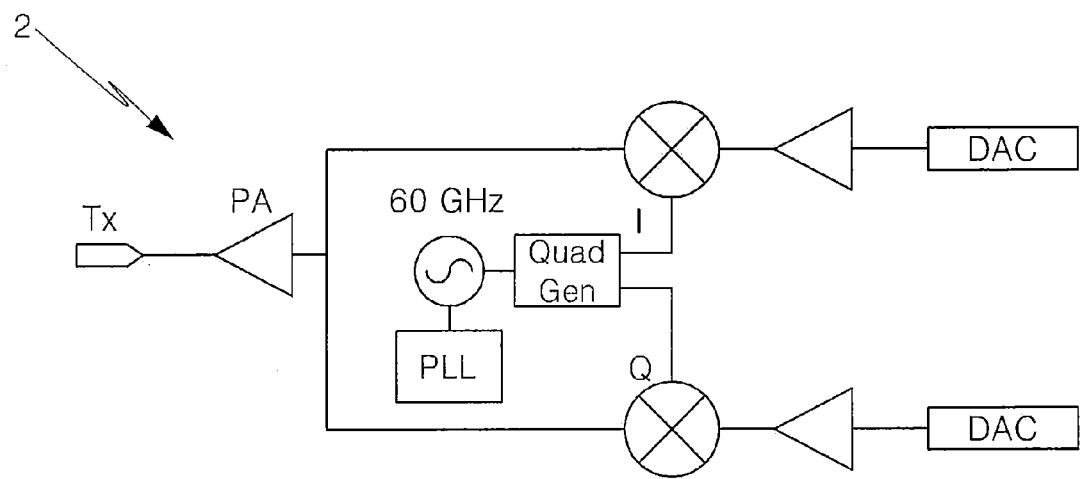
FIG. 1 is an exemplary view showing a structure of a conventional millimeter transmitter.
Figure 2:
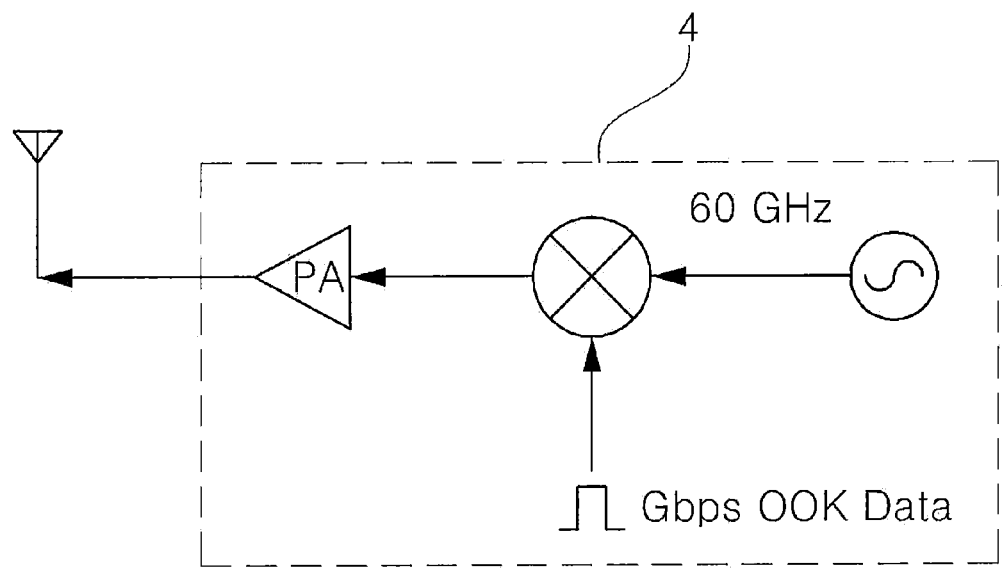
FIG. 2 is an exemplary view showing a conventional millimeter-wave OOK (On-off Keying) modulation structure.

Hereinafter, embodiments of the present invention will be described in detail with reference to the accompanying drawings in such a manner that the present could be easily implemented by those having ordinary skill in the art to which the present invent pertains. The present invention may, however, be embodied in different forms and should not be construed as limited to the embodiments set forth herein. In the following description, it is to be noted that, when the functions of conventional elements and the detailed description of elements related with the present invention may make the gist of the present invention unclear, a detailed description of those elements will be omitted. Also, it should be understood that the shape and size of the elements shown in the drawings may be exaggeratedly drawn to provide an easily understood description of the structure of the present invention. As used herein, the singular forms "a," "an" and "the" are intended to include the plural forms as well, unless the context clearly indicates otherwise.

Figure 4:
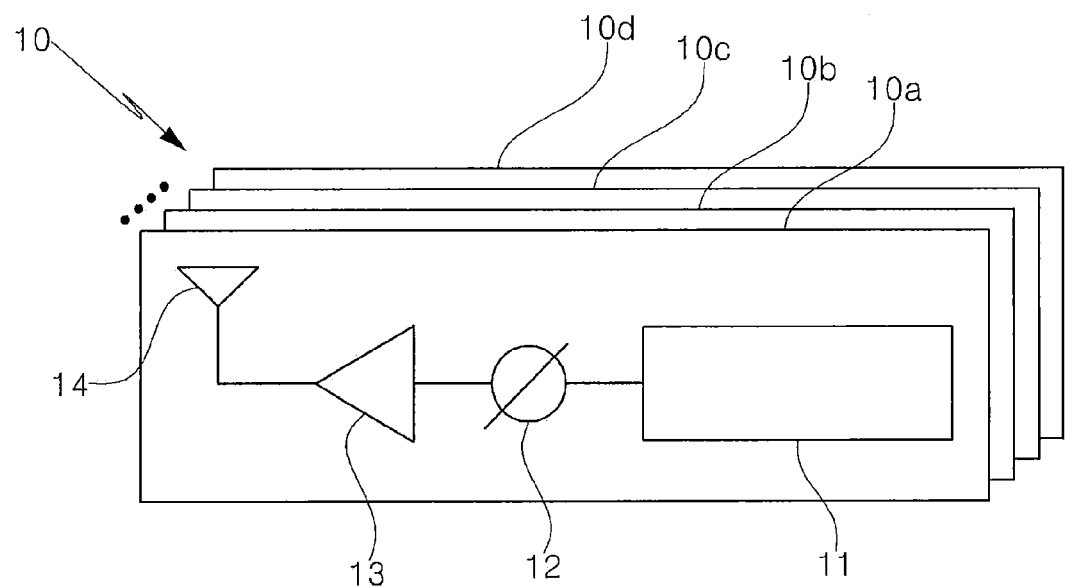
FIG. 4 is a schematic block diagram of a millimeter-wave modulation apparatus according to an embodiment of the present invention.
Figure 5:
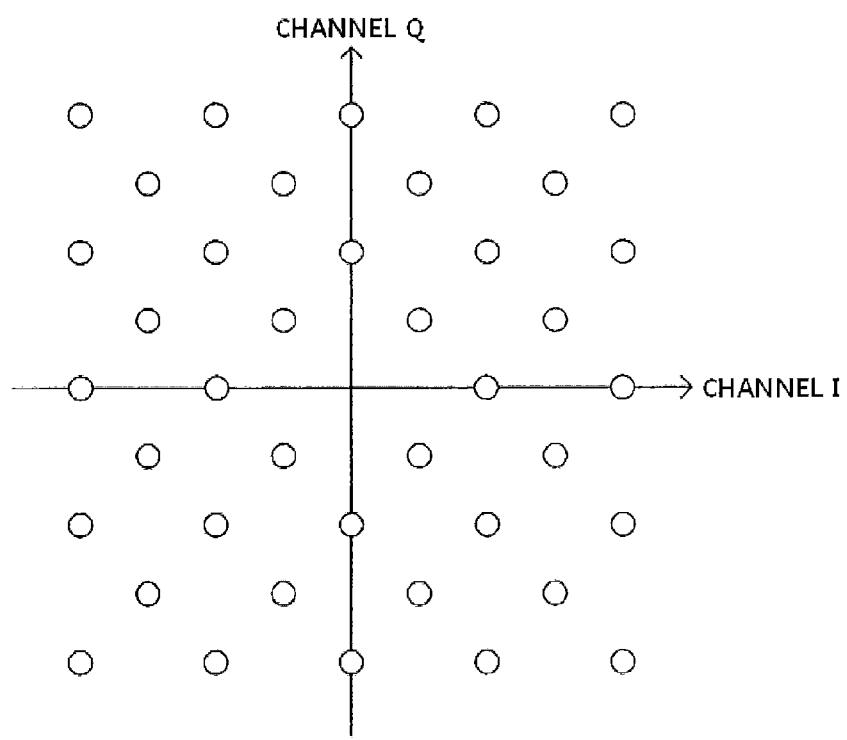
FIG. 5 is a constellation diagram of the millimeter-wave modulation apparatus of FIG. 4.

FIG. 4 is a schematic block diagram showing a millimeter-wave modulation apparatus according to an embodiment of the present invention. FIG. 5 is a constellation diagram of the millimeter-wave modulation apparatus of FIG. 4.

Referring to FIG. 4, a millimeter-wave modulation apparatus 10 according to the present embodiment of the invention includes: a first transmitter 10a including a modulation part 11, a phase shifter 12, a power amplifier 13, and an antenna (14); and a plurality of transmitters 10b, 10c, 10d each having a modulation part, a phase shifter, a power amplifier, and an antenna in the same structure as that of the first transmitter 10a. The plurality of transmitters 10a to 10d including the first transmitter may be manufactured in an array form using a micro process of a CMOS (Complementary Metal Oxide Semiconductor). The respective transmitters 10a to 10d may correspond to transmitter units for array.

An output by an MSK modulation of the millimeter-wave modulation apparatus 10 passes through an array antenna and is spread to the atmosphere. In such a case, the phase shifter 12 is applied each cell, thereby enabling waveforms to be optionally combined with each other in the atmosphere and thus performing a space modulation.

Thus, the aforesaid modulation may show the constellation view of a high order modulation as illustrated in FIG. 5 by combining power in the air space.

According to the configuration, the power amplifier 13 connected to each transmitter having the modulation part 11 may put forth maximum power, and outputs of a high order modulation by each transmitter are combined in the air space. Thus, a millimeter-wave modulation apparatus suitable for a high efficiency and high speed data communications can be provided.

Figure 3:
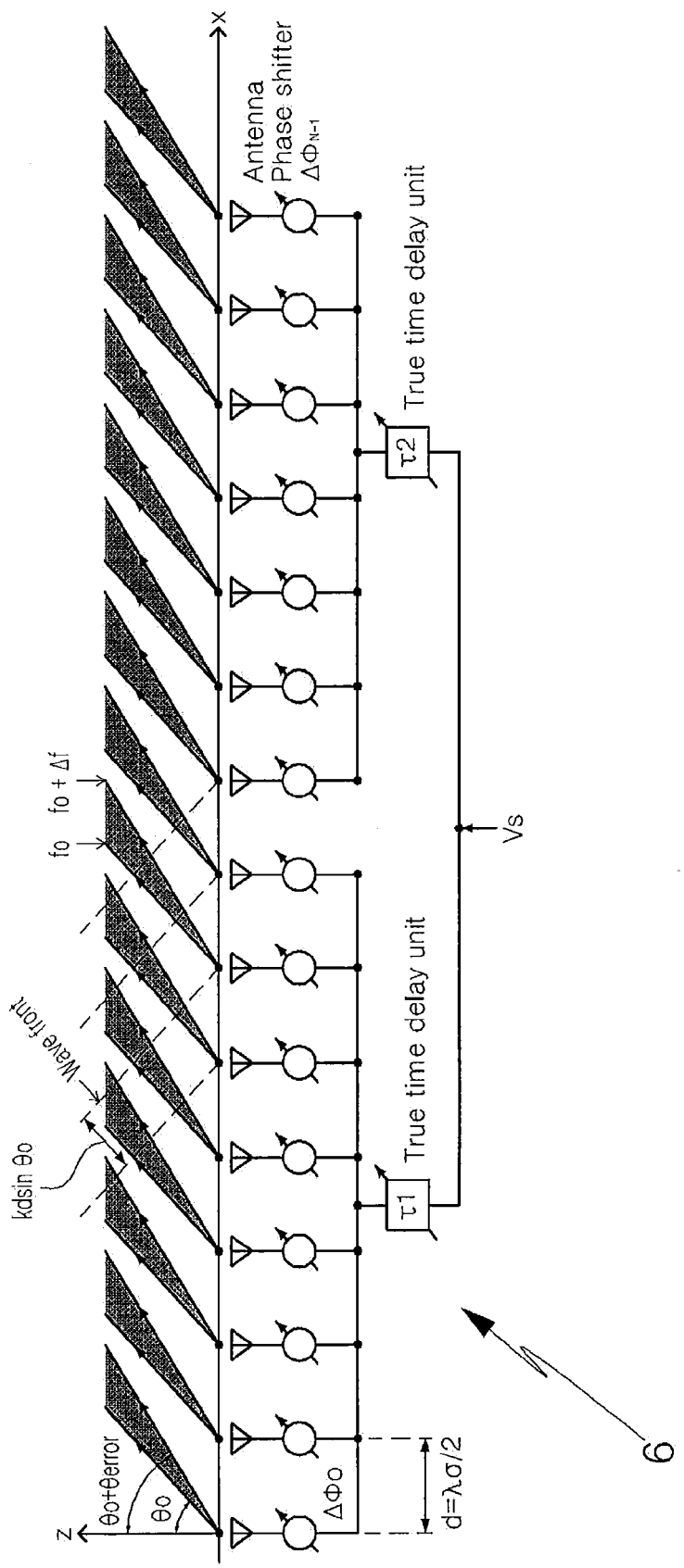
FIG. 3 is a partial exemplary view showing a structure of a conventional millimeter-wave array transmitter.

In particular, since a millimeter-wave communication system may be generally configured in an array form as shown in FIG. 3, it is advantageous in that the millimeter-wave modulation apparatus according to the present embodiment can be effectively applied to a structure in which a system is configured in an array form.

That is, the millimeter-wave modulation apparatus 10 according to the present embodiment has a structure in which the millimeter transmitters are configured in an array form as shown in FIG. 3. However, unlike the case shown in FIG. 3, a complicated digital modulation is not carried out by the transmitters and is implemented by a power combination in the atmosphere. As a result, each array may maximize efficiency using a high efficiency modulation method.

Figure 6:
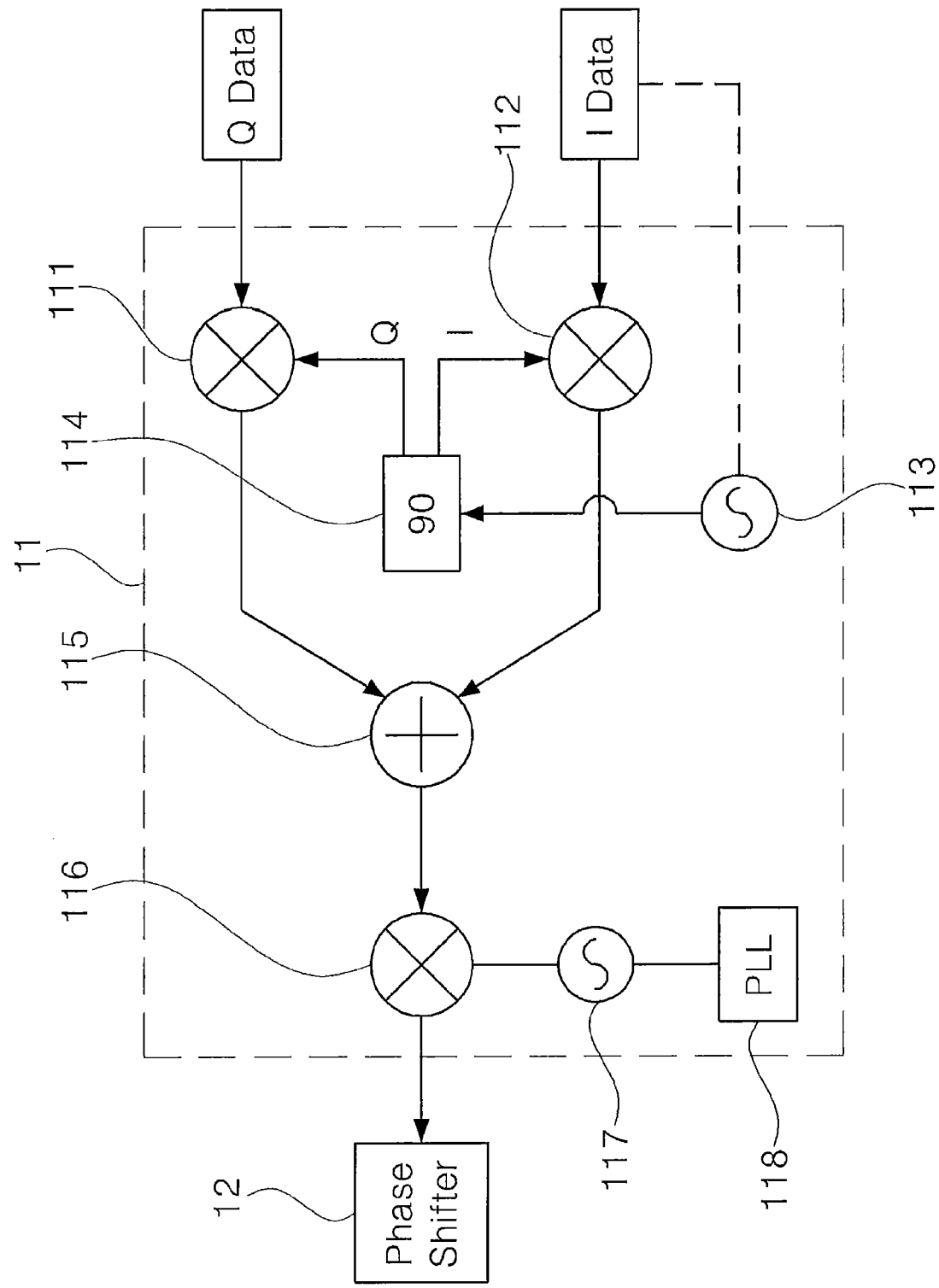
FIG. 6 is a block diagram showing a modulation part of the millimeter-wave modulation apparatus of FIG. 4.

FIG. 6 is a block diagram showing the modulation part of the millimeter-wave modulation apparatus of FIG. 4.

Referring to FIG. 6, the modulation part 11 according to the present embodiment may include: a first mixer 111; a second mixer 112; a first local oscillator 113; a quadrature generator 114; an adder 115; a third mixer 116; a second local oscillator 117; and a phase locked loop (PLL) 118. Of course, according to some embodiments, the phase locked loop may be installed at the outside of the modulation part 11 as a separate device.

The functions of the constitutive elements or a combination relationship among the constitutive elements will be hereinafter described in detail based on an operational process.

First, data I and data Q are input into the first mixer 111 and the second mixer 112, respectively, and a local oscillation signal of the first local oscillator 113 having a modulation speed which is automatically changed is input into the first mixer 111 and the second mixer 112 as the I-signal of an in-phase and the Q-signal of a quadrature phase. A first frequency of the first local oscillation signal outputted from the first local oscillator 113 is smaller than a second frequency (transmission frequency) of a transmitting signal delivered from the antenna.

An output of the first mixer 111 and an output of the second mixer 112 are added by the adder 115 and are transmitted to the third mixer 116. The third mixer 116 causes up conversion of the output of the adder 115 and a second local oscillation signal of the second local oscillator 117, thereby creating a transmitting signal. The created transmitting signal is transmitted to the phase shifter (see reference numeral 12 of FIG. 4).

The second local oscillator 117 is a means for creating an outputting a local oscillation signal, and also refers to a constitution part performing a function that is equivalent to this means. The local oscillation signal may be a sine wave signal having a predetermined frequency, for example, the frequency of a transmitting signal to be delivered via an antenna 19. That is, the second local oscillator 117 is connected to the phase locked loop 118 to receive a reference signal, and the second local oscillator may correct or stabilize the local oscillation signal using the reference signal.

In addition, the second local oscillator 117 may be implemented as a transistor oscillator using a transistor, a diode oscillator using a diode, or the like, but is not limited thereto. For example, when the modulation apparatus 10 uses a plurality of transmission frequencies, the second local oscillator 117 may be implemented as a voltage controlled oscillator (VCO) capable of changing the frequency of a local oscillation signal in order to create the local oscillation signal. That is, according to some embodiments, the second local oscillator 117 may be operated or implemented to change the frequency of the local oscillation signal to a desired frequency according to a change in a specific part of the phase locked loop 118.

In the present embodiment, the second local oscillation signal may have the millimeter frequency in a band ranging from several GHz to dozens of GHz, but is not limited thereto. According to some embodiments, the second local oscillation signal may be the millimeter frequency in a band of greater than 100 GHz.

The phase locked loop 118 may be a reference frequency signal generating part transmitting a reference signal to the second local oscillator 117. The phase locked loop 118 creates a reference frequency having the same frequency as that of the local oscillation signal created by the second local oscillator 117. The phase locked loop 118 supplies the reference signal having a reference frequency to the second local oscillator 117, and thus is operated to prevent an oscillation frequency of the local oscillation signal of the second local oscillator 117 from being changed according to a surrounding environment (a temperature, or the like). Of course, some embodiments, the phase locked loop 118 may be implemented so that the frequency of the local oscillation signal is changed to a desired frequency (oscillation frequency).

In the present embodiment, the first local oscillator 113 is an oscillator that is locked according to the rate of input data (for example, data I). That is, the first local oscillator 113 is implemented, as an injection locked oscillator, so as to change a data rate. Thanks to this structure, an MSK modulation may be automatically caused according to input data so that a lower power and high efficiency communication modulation can be realized.

In addition, the millimeter-wave modulation apparatus according to the present embodiment is advantageous in that a modulation process may not go through a zero phase because a modulation having a constant envelope is used so that efficiency of a millimeter-wave power amplifier can be maximally increased.

Figure 7:
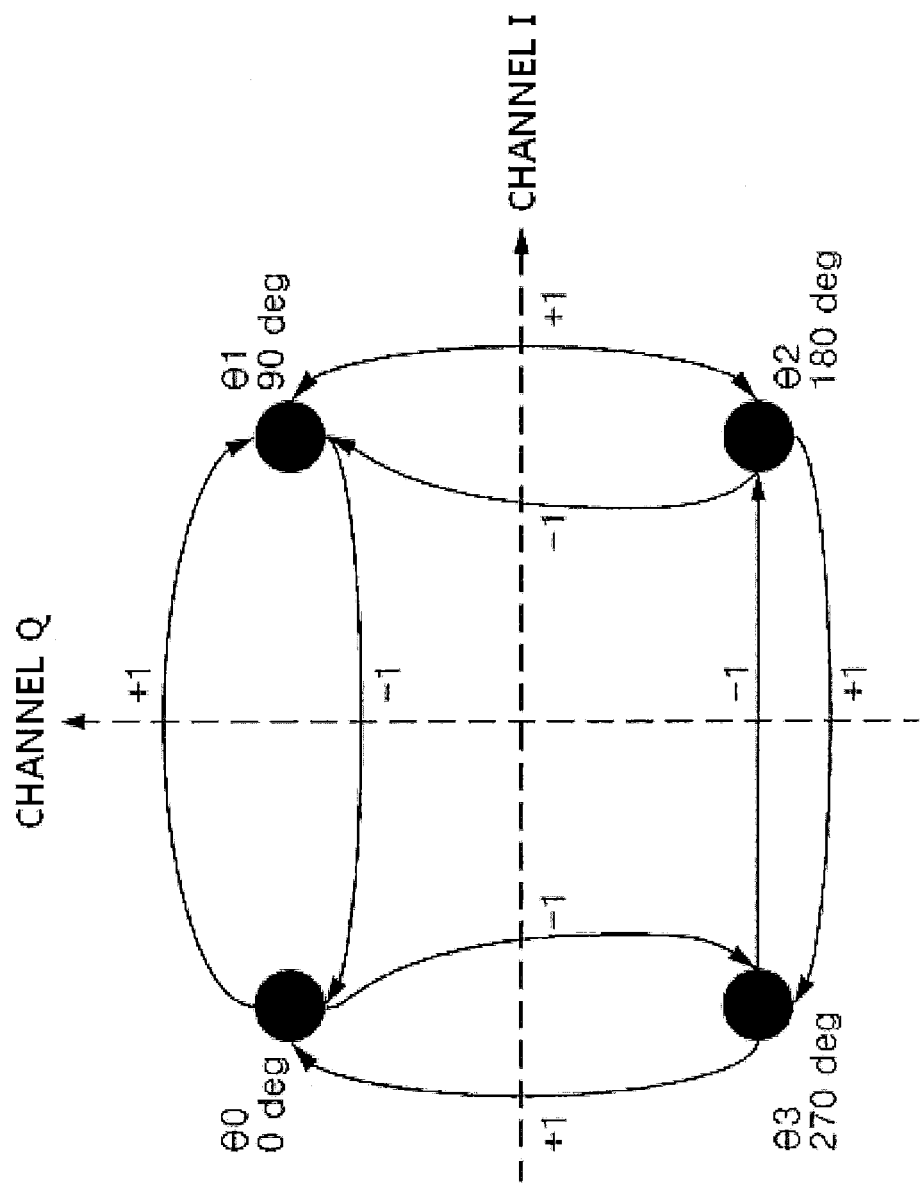
FIG. 7 is an MSK constellation diagram for explaining an operational principle of the modulation part of FIG. 6.

FIG. 7 is an MSK constellation diagram for explaining an operational principle of the modulation part of FIG. 6.

As illustrated in the constellation diagram of MSK (Minimum Shift Keying) of FIG. 7, since the modulation part according to the present embodiment does not cause zero crossing when a symbol changes, the modulation part carries out a modulation in a constant envelope modulation mode. Accordingly, data may be put in a transmitting signal through the modulation at a maximum output of the power amplifier of each transmitter constituting an array. In this case, efficiency of the power amplifier of the present embodiment is remarkably excellent compared to efficiency of the power amplifier of a conventional high order PAPR modulation.

An MSK modulated waveform of the modulation part according to the present embodiment is represented by Equation 1 below.

$$V_{rf} = A_I(t)\cos\left(\frac{\pi t}{2T}\right)\cos(2\pi f_c t) - A_Q(t)\sin\left(\frac{\pi t}{2T}\right)\sin(2\pi f_c t)$$
$$= \cos\left[2\pi f_c t + B(t)\frac{\pi t}{2T} + \theta(t)\right]$$

[Equation 1]

In Equation 1 above, B(t) represents 1 when AI(t) is the same as AQ(t), or represents −1 when AI(t) is different from AQ(t), and θ(t) represents 0 when AI(t) is 1, or represents π in the remaining cases except therefor. As can be seen from Equation 1, MSK produces a constant envelope attribute while simultaneously causing a phase and frequency modulation.

Figure 8:
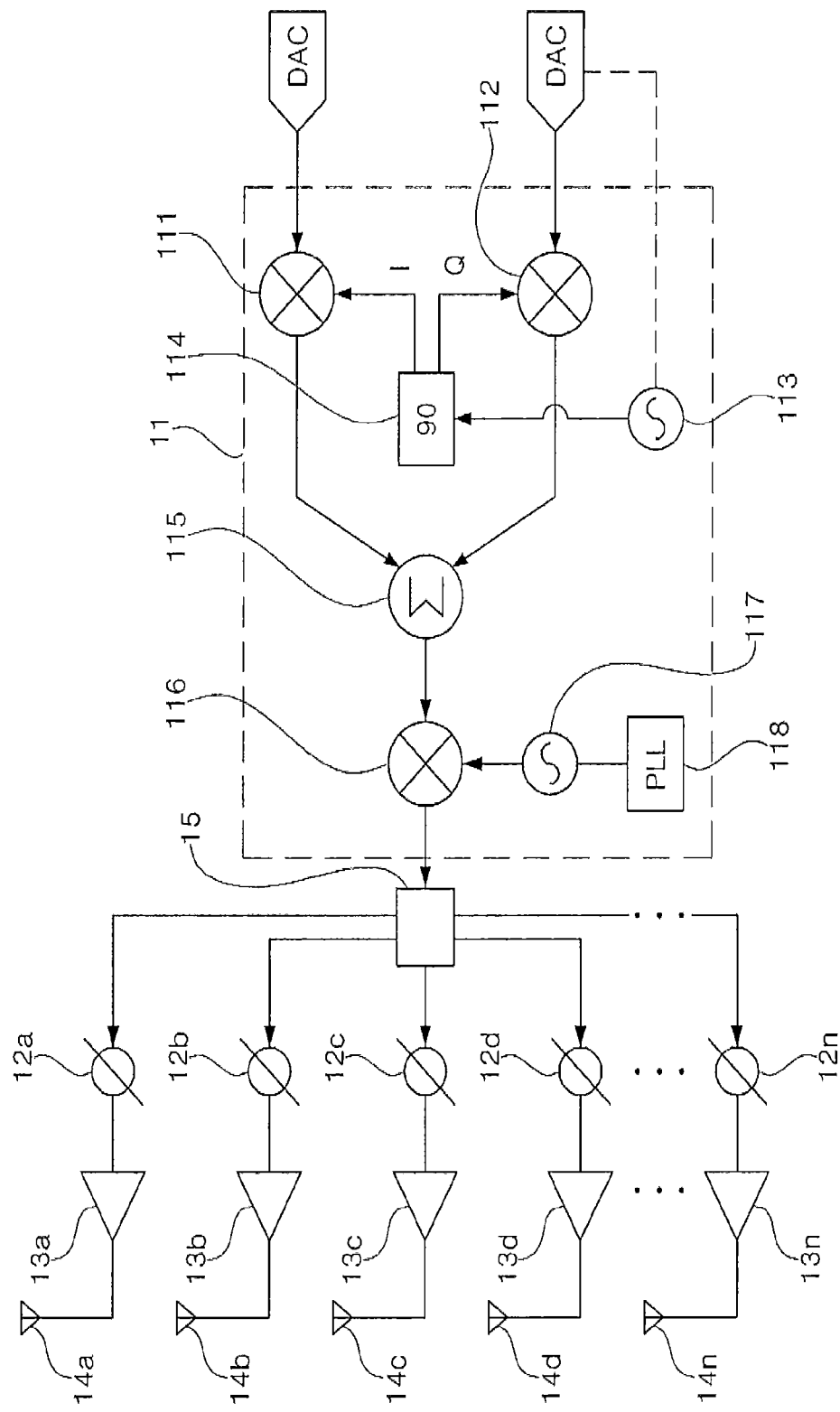
FIG. 8 is a block diagram of a millimeter-wave modulation apparatus according to another embodiment of the present invention.

FIG. 8 is a block diagram of a millimeter-wave modulation apparatus according to another embodiment of the present invention.

Referring to FIG. 8, the millimeter-wave modulation apparatus according to the present embodiment may be implemented to share the modulation part 11. That is, transmitter arrays composed of each of a plurality of phase shifters 12a to 12n, and each of a plurality of power amplifiers 13a to 13n, and each of a plurality of antennas 14a to 14n may be implemented to be connected to the modulation part 11 via the switching device 15.

According to the aforesaid configuration, switches in the switching device 15 may be controlled according to the polarity direction of an electric field to the traveling direction of an electromagnetic wave in each antenna so that a transmitting signal of the modulation part 11 is transmitted to the corresponding phase shifter and power amplifier. Thus, it is advantageous in that the structure can be simplified.

Figure 9:
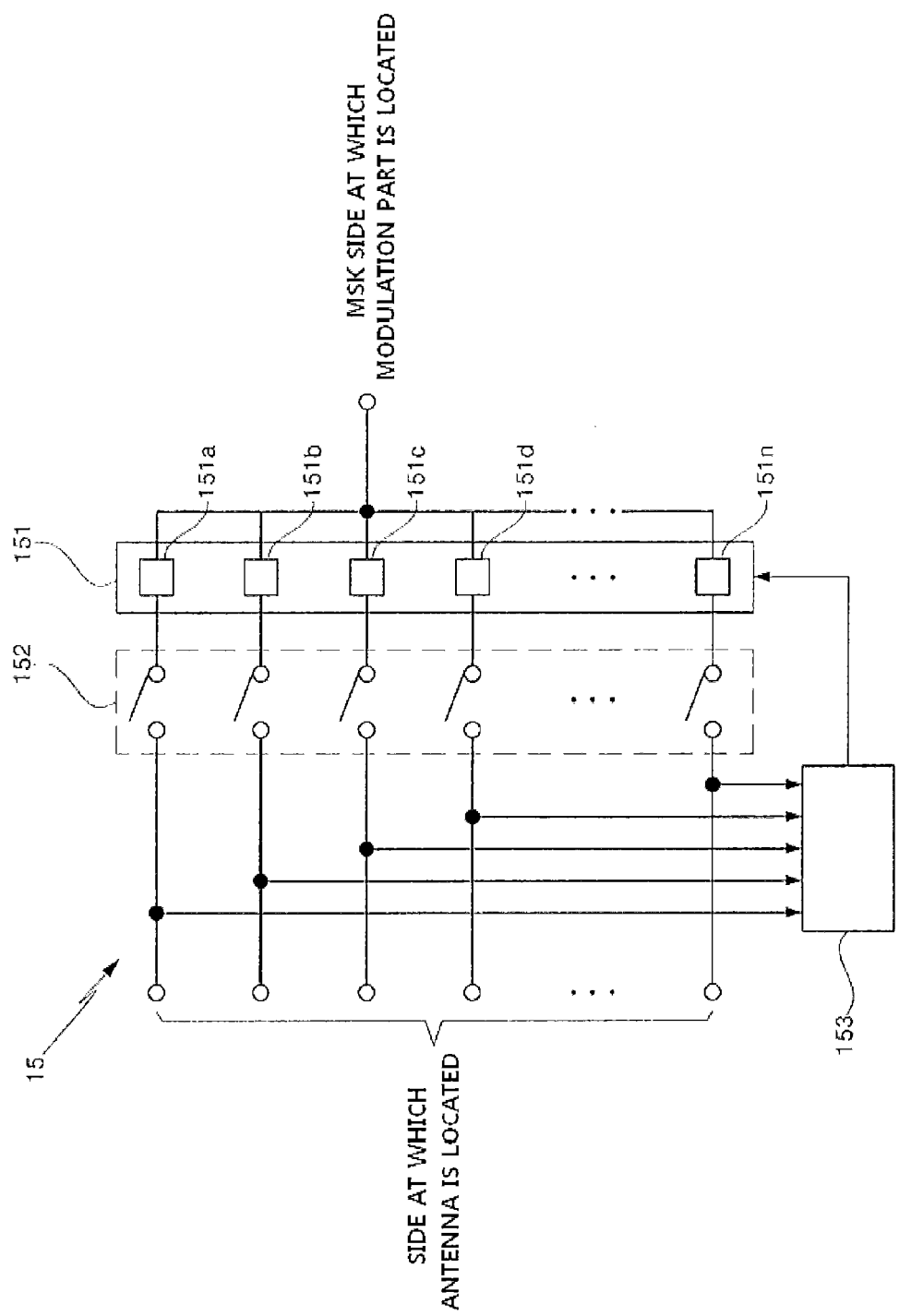
FIG. 9 is a block diagram showing a switching device that can be applied to the millimeter-wave modulation apparatus of FIG. 8.

FIG. 9 is a block diagram showing a switching device that can be applied to the millimeter-wave modulation apparatus of FIG. 8.

Referring to FIG. 9, the switching device 15 according to the present embodiment may include a delay drive part 151; a plurality of switches 152; and a delay control part 153.

The delay drive part 151 may include a plurality of delay locked loop (DLL) 151a, 151b, 151c, 151d, ..., 151n installed between the modulation part and each power amplifier, or between the modulation and an antenna.

Each switch included in the plurality of switches 152 is installed between each of the delay locked loops and each of the power amplifiers.

The delay control part 153 senses signals transmitted to the power amplifiers through the respective switches, thereby controlling the plurality of delay locked loops 151a to 151n of the delay drive part 151. The delay control part 153 may include: a coupler adopted to combine signals outputted via each switch; a receiver adopted to down-convert the combined signals to signals in an intermediate frequency band; a filter adopted to remove the remaining signals except for noise signals from the down-converted signals; a calculation part adopted to calculate delay information for switch control showing the biggest decrease in a noise magnitude by using the noise signals.

According to the present embodiment, in addition to the characteristic of the first local oscillator 113 in which an oscillation frequency is automatically fixed according to input data rate, a space modulation may be performed by controlling outputs by an MSK modulation to be easily coupled in a desired waveform. Thus, each power amplifier can be operated at maximum power, and high efficiency and high speed data communications can be realized.

Meanwhile, in the aforesaid embodiment, for convenience of the description, it has been explained that the modulation part, which carries out the MSK modulation, is included, but the present invention is not limited to this configuration. The modulation part may be replaced by other modulation parts that carry out an ASK modulation or BPSK modulation having a constant envelope attribute. In this case, like the aforesaid embodiment, a lower power and high efficiency millimeter-wave modulation apparatus can be also provided.

As set forth above, according to some embodiments of the present invention, the millimeter-wave modulation apparatus capable of increasing power efficiency, as well as transmission efficiency, using a constant envelope modulation mode for increasing the data transmission efficiency of millimeter transmitters for high speed data communications, may be provided.

In addition, according to some embodiments of the present invention, lower power millimeter communications can be carried out, and new product lines can be formed in the high speed communication market.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A millimeter-wave modulation apparatus, comprising:
a plurality of transmitter units; and
a modulation part, which carries out a modulation of a constant envelope attribute, and to which a first local oscillation signal is fixed according to a rate of input data;
wherein each of the plurality of transmitter units comprises:
a phase shifter adapted to shift a phase of an output of the modulation part,
a power amplifier adapted to amplify an output of the phase shifter, and
an antenna connected to an output of the power amplifier;
wherein the plurality of transmitter units are connected to the modulation part via a switching device;
wherein the switching device comprises:
a plurality of switches installed between the phase shifter of each of the plurality of transmitter units and the modulation part,
a delay drive part having a plurality of delay locked loops, each of the delayed locked loops is installed between each of the plurality of switches and the modulation part, and
a delay control part extracting delay information for controlling the delay drive part based on signals transmitted to the phase shifter of each of the plurality of transmitter units via each of the plurality of switches,
wherein the modulation part is configured to carry out a Minimum Shift Keying (MSK) modulation, and an MSK modulated waveform of the modulation part is represented by the following equation:

$$V_{rf} = A_I(t)\cos\left(\frac{\pi t}{2T}\right)\cos(2\pi f_c t) - A_Q(t)\sin\left(\frac{\pi t}{2T}\right)\sin(2\pi f_c t)$$
$$= \cos\left[2\pi f_c t + B(t)\frac{\pi t}{2T} + \theta(t)\right]$$

wherein, B(t) represents 1 when AI(t) is the same as AQ(t), or represents −1 when AI(t) is different from AQ(t), and θ(t) represents 0 when AI(t) is 1, or represents π in the remaining cases except therefor.

2. The apparatus of claim 1, wherein the modulation part comprises:
a first local oscillator to which a first local oscillation signal is fixed according to an input data rate of data I or data Q;
a quadrature generator adapted to convert the first local oscillation signal into an I-signal of an in-phase and a Q-signal of a quadrature phase;
a first mixer and a second mixer adapted to receive the data I and data Q, respectively, and to receive the I-signal and the Q-signal of the quadrature generator, respectively;
an adder adapted to add an output of the first mixer and an output of the second mixer; and
a third mixer adapted to up-convert an output of the adder and a second local oscillation signal in a millimeter wave band that is output from a second local oscillator.

3. The apparatus of claim 2, further comprising a phase locked loop providing a reference signal having a frequency in the millimeter wave band to the second local oscillator.

4. The apparatus of claim 2, wherein the first local oscillator comprises an injection locking oscillator.

5. The apparatus of claim 1, wherein the plurality of transmitter units are arranged in an array form for a space modulation.

\* \* \* \* \*